Patented July 16, 1940

2,207,967

UNITED STATES PATENT OFFICE 2,207,967

PAINT AND VARNISH REMOVER

William A. Bland, Primos, and Edmund F. Oeffinger, Aldan, Pa., assignors to E. I. du Pont de Nemours & Company, Wilmington, Del., a corporation of Delaware No Drawing. Application November 4, 1937, Serial No. 172,734

3 Claims. (Cl. 252—163)

This invention relates to a composition and method of preparing the same for removing finishes such as paints, varnishes, lacquers, and synthetic resin enamels.

Compositions for removing paints, varnishes, and the like have been on the market for a large number of years. Many different types have been proposed, but most of them fall within one or two general classes. The first of these depends upon the solvent power of the constituents of the paint remover to dissolve or at least soften the film. The second type attacks the film by the chemical action of the ingredients; for example, alkalies or acids. In the former of these two types, it is customary to use aromatic hydrocarbons, lower aliphatic esters, ketones, alcohols, and the like. The vapor pressure of such liquids is necessarily high so that it is difficult to keep the paint or lacquer surface wet with the liquid due to its rapid evaporation. It has been proposed to overcome this difficulty by adding paraffin wax to such liquids to reduce their evaporation rate and thus prolong their contact with the finish to be removed so that it may be softened and readily scraped off. The alkali or acid type of composition are not entirely satisfactory since they require considerable after treatment to insure complete removal of the alkali or acid, and further have the disadvantage that they discolor wood.

In cases where paraffin wax is used to retard the evaporation of the solvent, there still remains one drawback which is typical of most solvent type removers and that is that when they are applied to vertical surfaces they naturally flow downwardly leaving the upper portion practically free from remover. This condition is particularly encountered in removing finishes from surfaces which cannot be laid in a horizontal position such as walls and the sides of automobiles. Removers of this type containing paraffin wax have the additional disadvantage that the wax has a tendency to separate at low temperatures from the solution, and in such a condition materially loses its effectiveness.

With the introduction of synthetic resin finishes for automobiles, new problems have arisen in connection with refinishing automobiles which have been in service. Such finishes are somewhat more difficult to remove, and it is necessary that the remover be kept in contact with the surface of the film to be removed for a time sufficient to soften it so that it may be easily removed by scraping.

This invention has as an object the provision of a means for removing paint, varnish, lacquer, and synthetic resin enamel films.

Another object is the provision of a method for preparing such a paint remover which will adhere to a vertical surface.

Other objects will become apparent as the description of the invention proceeds.

These and other objects of the invention are accomplished by preparing a gel dispersion of a metallic soap in an aromatic hydrocarbon to which is added a suitable wax and further solvents.

The following example is given to illustrate one embodiment of the invention, but it will be understood that the invention is not limited to the specific details given in this example:

Example

|  | Parts by weight |
|---|---|
| Toluol | 361.5 |
| Acetone | 177.0 |
| Denatured alcohol | 170.0 |
| Ceresin wax | 16.5 |
| Beeswax | 16.5 |
| Calcium stearate | 11.0 |
|  | 752.5 |

In preparing this composition the calcium stearate is suspended in the toluol by thoroughly agitating the same to form a slurry. This slurry is then gradually heated with constant agitation to avoid local overheating to a temperature of 210 to 220° F. and is kept at this temperature until a very stiff gel forms, which requires from about 5 to 15 minutes. The gel formed is quite stiff when hot and somewhat stringy. The beeswax and ceresin wax are then melted and added with vigorous stirring to the calcium stearate gel. The alcohol and acetone are then added to the mass with thorough stirring until a uniform consistency is obtained.

In preparing the calcium stearate gel the temperature range and time of heating are critical. A gel does not form in less than 5 minutes, and if heating is continued for a longer period than 15 minutes the gel breaks and is not satisfactory for the purpose intended. It is preferable to use all the toluol in the preparation of the calcium stearate gel, although a modification of the process may be used in which only a portion is added at this stage and the remainder is added with the acetone and alcohol.

The stearate contained in the above example is approximately 1.5% of the total composition; however, it may vary between 1 and 5%. In place of calcium stearate, other alkaline earth metal stearates may be used. Alkaline earth metal palmitates are also satisfactory instead of the stearates and in addition to the alkaline earth metal soaps, those of zinc and aluminum and similar metals may be used such as zinc stearate and aluminum palmitate.

The ceresin and beeswax content in the example are approximately 2.2%. However, this may be increased up to about 8% and in some cases even higher although there is no advantage in using more. The entire wax content may be either beeswax or ceresin wax, but a mixture of the two in about equal proportions is preferred, although other proportions give satisfactory results. Paraffin waxes may be used at least as a part of the wax constituent, but it is preferred to use a proper balance of non-crystalline and crystalline waxes for the best results.

The toluol content may vary between 25 and 75% of the composition where other solvents are used. It may, if desired, form the sole liquid portion of the composition. The acetone and alcohol may be varied between 0 and 50% of the total composition. Acetone and toluol or alcohol and toluol may be used in suitable proportions in place of acetone and alcohol. Other ketones such as methyl ethyl ketone may be used in place of acetone. It has also been found that methyl alcohol and other lower aliphatic mono-hydric alcohols may replace the ethyl alcohol in part or entirely. Similarly, benzol may be used as a substitute for the toluol although this is not desirable because of its toxic nature. When it is used, however, the speed of gellation of the metallic soap is retarded with a consequent loss of benzol because of its lower boiling point. Xylol is also a satisfactory substitute for the toluol.

The compositions made according to the described procedure are excellent for removing aged and weathered films of prepared paints, cellulose derivative lacquers, air dried and ordinary baked as well as high temperature baked alkyd resin type enamels, urea-formaldehyde resin enamels, phenolic resin compositions, high temperature baked asphalt base enamels, quick drying colored enamels having an oleoresinous base, various types of varnish compositions, etc. The compositions are particularly useful in removing synthetic resin enamel coatings as the alkyd resin type which are very difficult to remove with the present type of paint and varnish removers. This is particularly important in connection with removing coatings from vertical surfaces or slanting surfaces as for example the sides and fenders of automobile bodies. With the present type of remover only a small area can be treated with the remover and repeated treatments are necessary. Even then the coating is only removed with considerable effort and is time consuming which makes the operation costly. For example, when the common type remover containing wax as at present available, is applied to a coating on a vertical surface the remover rapidly flows to the lower part of the surface accumulating in a rather thick film, the upper portion being thus practically devoid of the remover. While the coating on the lower portion of such an area may be removed fairly satisfactorily the coating on the upper portion is removed only with great difficulty and frequently not in a satisfactory manner.

If, however, the composition of the present invention is applied to an area of coating on a similar vertical surface it remains as a covering of substantially uniform thickness over the entire surface, upper portion as well as lower portion for a period of ½ hour or longer. The active ingredients of the composition are thus held in contact with the coating for a time sufficient to completely soften the coating so that it may be easily removed by scraping. Under certain conditions a single application is sufficient to completely soften the coating for removal whereas with the present type of conventional removers repeated applications are necessary. The economic advantages in the use of the composition of the present invention are evident. There is an advantage in the saving of material necessary to remove a coating as well as an appreciable saving in time consumed, the latter being an important item in such operations. As previously noted the compositions of the present invention are particularly useful in removing aged and weathered coatings of synthetic enamel coatings which have found extensive application in the past few years and which are rather difficult and time consuming to remove. With the compositions described and claimed herein a synthetic enamel coating can be removed from an automobile body in about half the time required when the present type of removers containing wax are used and a much more satisfactory result is obtained. The marked advantages of the compositions of the present invention are therefore readily apparent.

It has been found that the simple addition of the alkaline earth soap, without first dispersing the soap as a gel, to the liquid portion of the composition containing the waxes does not produce the desired result. The formation of the gel is therefore an essential step in the preparation of the compositions of the present invention.

It is apparent that many widely different embodiments of this invention may be made without departing from the spirit and scope thereof; and, therefore, it is not intended to be limited except as indicated in the appended claims.

We claim:

1. The process of preparing paint, varnish, lacquer, and enamel removers, which comprises dispersing an alkaline earth metal soap in a liquid aromatic hydrocarbon to form a slurry, heating with constant agitation to a temperature of about 210 to 220° F., maintaining this temperature from 5 to 15 minutes, and while hot, adding a wax thereto, and subsequently incorporating lacquer solvent.

2. Process of preparing paint, varnish, lacquer, and enamel removers which comprises dispersing an alkaline earth metal stearate in a liquid aromatic hydrocarbon to form a slurry, heating with constant agitation to a temperature of about 210 to 220° F., maintaining this temperature from 5 to 15 minutes, and while hot adding a mixture of beeswax and ceresin wax thereto and subsequently adding a lacquer solvent.

3. The process of preparing paint removers which comprises dispersing about one part of calcium stearate in about thirty parts of toluol, heating to a temperature of about 210 to 220° F., and maintaining this temperature from 5 to 15 minutes, adding to the hot dispersion about three parts of a mixture of ceresin and beeswax, and subsequently adding about thirty parts of a mixture of alcohol and acetone.

WILLIAM A. BLAND.
EDMUND F. OEFFINGER.